United States Patent
Howell et al.

(10) Patent No.: US 6,314,739 B1
(45) Date of Patent: Nov. 13, 2001

(54) BRAZELESS COMBUSTOR DOME ASSEMBLY

(75) Inventors: Stephen J. Howell, Georgetown; Jennifer Waslo, Marblehead; Robert G. Carita, Needham, all of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/482,666

(22) Filed: Jan. 13, 2000

(51) Int. Cl.$^7$ .................................................. F02C 1/00
(52) U.S. Cl. ................................................................ 60/748
(58) Field of Search ................................... 60/748, 39.31, 60/39.32, 740, 39.33; 239/533.12, 339, 408, 461, 490, 494, 495, 496, 399, 402, 402.5, 405

(56) References Cited

U.S. PATENT DOCUMENTS

| | | | |
|---|---|---|---|
| 4,974,416 | * 12/1990 | Taylor | 60/737 |
| 5,117,637 | * 6/1992 | Howell et al. | 60/748 |
| 5,623,827 | * 4/1997 | Montry | 60/748 |
| 5,916,142 | * 6/1999 | Snyder et al. | 60/748 |
| 6,035,645 | * 3/2000 | Bensaadi et al. | 60/742 |

* cited by examiner

Primary Examiner—Charles G. Freay
Assistant Examiner—William H Rodriguez
(74) Attorney, Agent, or Firm—Andrew C. Hess; Rodney M. Young

(57) ABSTRACT

A dome assembly for a gas turbine engine combustor includes an annular combustor dome with a substantially annular flat dome plate and at least one circular opening in the dome plate. A seal plate flange with a flat aft facing surface has a central ring circumscribed about a centerline axis and extends aftwardly from the seal plate flange. The central ring is disposed through the circular opening in the dome plate and the central ring includes a central bore coaxially aligned with the circular opening. A baffle has a cylindrical tubular mounting portion extending upstream through the central bore and is fixedly joined to the seal plate and a flare portion extending aft from the seal plate flange. A carburetor including an air swirler having an annular exit cone is joined to the baffle with the exit cone disposed within the cylindrical tubular mounting portion of the baffle. An aft end of the central ring is joined to the dome plate by a swage joint. The seal plate flange is preferably flat and has a rounded corner triangular shape with three wings having radially outer arcuate edges with respect to the centerline axis. Legs extend axially aftwardly from the aft facing surface of the seal plate flange wherein each of the legs is located about midway between each two of the three wings and the seal plate flange is joined to the dome plate by second tack welds between the legs and the dome plate.

18 Claims, 4 Drawing Sheets

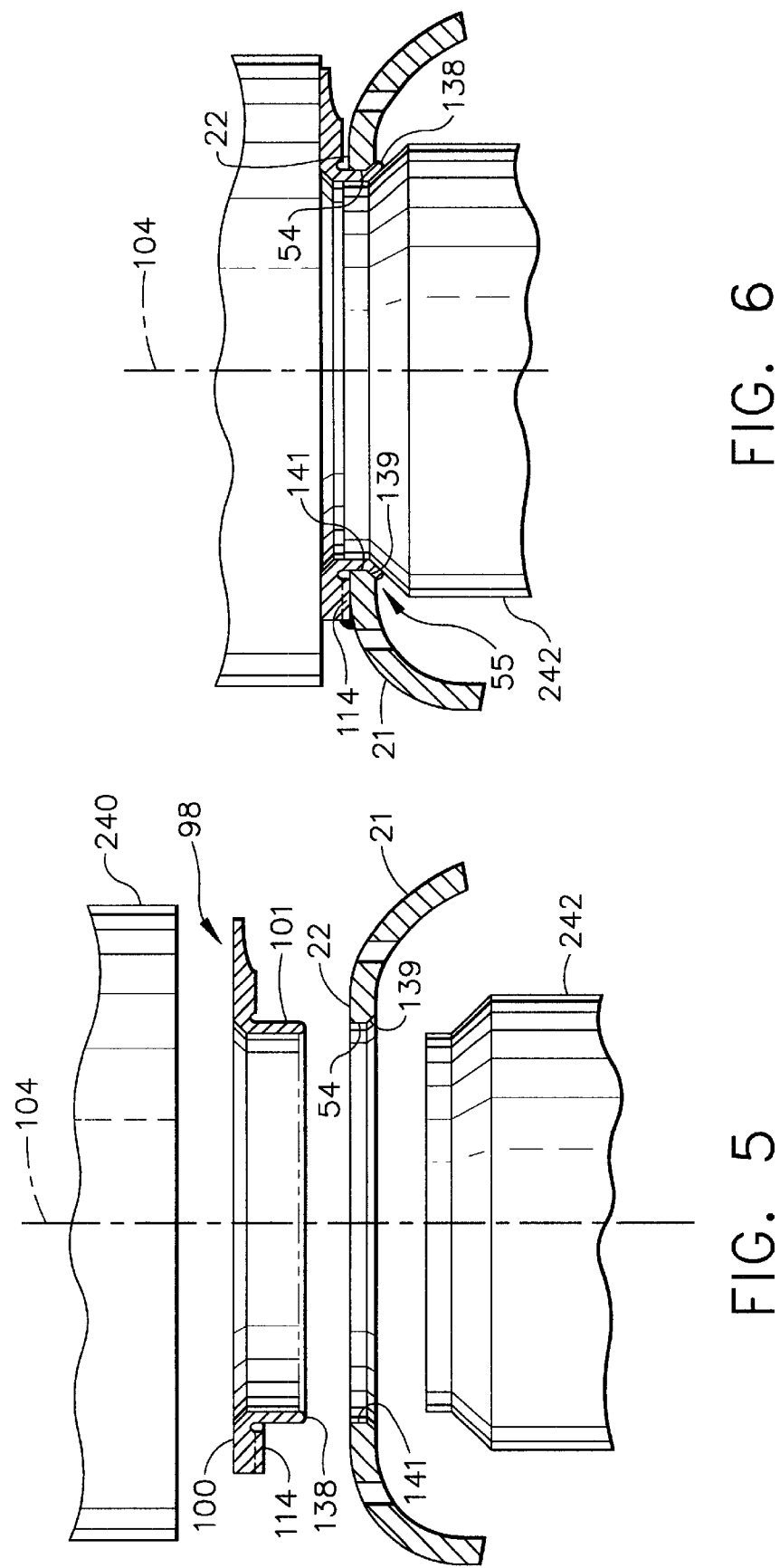

BRAZELESS COMBUSTOR DOME ASSEMBLY

BACKGROUND OF THE INVENTION

1. Field of the Invention

The present invention relates generally to gas turbine engine combustors and, more specifically, to a combustor dome assembly.

2. Description of Related Art

A conventional gas turbine engine combustor includes radially spaced outer and inner combustor liners joined at an upstream end thereof by a combustor dome. The combustor dome is typically made of sheet metal and is part of a combustor dome assembly that includes a plurality of circumferentially spaced carburetors therein, with each carburetor including a fuel injector for providing fuel and an air swirler for providing swirled air for mixing with the fuel for creating a fuel/air mixture discharged into the combustor between the two liners. The mixture is burned for generating combustion gases which flow downstream or aftwardly through the combustor to a turbine nozzle suitably joined to the aft end of the combustor. Immediately downstream of the turbine nozzle is a high-pressure turbine which extracts energy from the combustion gases for powering a compressor disposed upstream of the combustor which provides compressed air to the engine.

A significant consideration in the design of the gas turbine engine combustor is serviceability of the life-limiting parts therein. For example, a typical dome assembly includes a baffle extending from the air swirler and spaced from the combustor dome for providing a channel therebetween for channeling compressor air for cooling at least the baffle itself. The baffle is subject to intense heating from combustion and, thus, is one life-limiting part which is replaced at periodic intervals.

The baffle is typically welded and/or brazed to the dome and, typically, requires replacement of the entire dome assembly therewith or substantial disassembly work at the periodic service intervals. Such baffle replacement service is relatively expensive and requires a significant amount of time. U.S. Pat. No. 5,117,637 entitled "Combustor Dome Assembly" discloses a gas turbine engine combustor dome assembly mounting ring fixedly joined to the dome around a dome eyelet in a combustor dome. A baffle and a carburetor are fixedly joined to the mounting ring. The carburetor is joined to the mounting ring by its air swirler. The mounting ring is designed for assembly with reduced stackup clearances and easy disassembly for servicing. Each mounting ring is fixedly joined to a respective dome eyelet by welding or brazing. U.S. Pat. No. 5,117,637 is incorporated herein by reference.

The mounting ring also provides sealing and air leakage control between the air swirler of the carburetor and dome which results in good combustor performance and a good Pattern Factor. Leakage control is expensive to provide. Other designs have a lower cost dome assembly which has more leakage and produces a higher less desirable Pattern Factor. It is highly desirable to provide a low cost dome assembly which has been demonstrated to provide good leakage control. It is also desirable to provide a low cost dome assembly which eliminates brazed joints.

SUMMARY OF THE INVENTION

An exemplary embodiment of the invention is a dome assembly for a gas turbine engine combustor having an annular dome with a substantially conical front portion herein after referred to as a dome plate and at least one circular opening in the dome plate. The dome assembly further includes a seal plate having a central ring circumscribed about a centerline axis. A seal plate flange is disposed about a forward end of the central ring. The central ring is disposed through the circular opening and includes a central bore coaxially aligned with the circular opening.

A baffle with a cylindrical tubular mounting portion extending upstream through the central bore is fixedly joined to the seal plate and a flare portion of the baffle extends aft from the seal plate. A carburetor including an air swirler having an annular exit cone is joined to the baffle with the exit cone disposed within the cylindrical tubular mounting portion of the baffle. The exit cone includes an annular radially outwardly extending annular cone flange, an annular barrel extending aftwardly from the cone flange, and a radially inwardly facing annular inner cone surface for channeling air thereover and downstream over the baffle flare portion.

An aft end of the central ring is joined to the dome plate by a swage joint. The swage joint is preferably formed by bending the aft end of the central ring with swaging so that it is inclined radially outwardly against the chamfer along a circumference of the circular opening in the dome plate. The seal plate flange preferably includes a flat forward facing surface and has a rounded corner triangular shape with three wings having radially outer arcuate edges with respect to the centerline axis. The seal plate is joined to the dome plate by second tack welds between the seal plate flange and the dome plate at three locations wherein each of the locations is between each of the three wings. Legs extend axially aftwardly from an aft facing surface of the seal plate flange to contact the dome plate wherein each of the legs is located about midway between each two of the three wings and the second tack welds are between the legs and the dome plate.

The seal plate flange triangular shape is preferably formed from a circle truncated along three straight lines forming three straight edges of the seal plate flange and each of the legs is located along a respective one of the straight edges. First tack welds between a flange edge of an annular flange of the exit cone and the wings of the seal plate flange fixedly join the carburetor to the seal plate. The cylindrical tubular mounting portion of the baffle is fixedly joined to the seal plate by third tack welds along the forward end of the central ring.

Dome cooling holes disposed through the dome plate are circumferentially spaced and located radially inwardly, with respect to the centerline axis, of the radially outer arcuate edges of the wings of the seal plate. An undercut is formed in each of the aft facing surfaces along radially outer portions of the wings of the seal plate flange and is axially disposed in front of at least some of the dome cooling holes which are axially inline with the wings. An undercut groove is formed in the aft facing surface along a circular intersection between the seal plate flange and the central ring.

One advantage of the seal plate and dome assembly of the present invention is that they provide inexpensive and good sealing and air leakage control between the air swirler of the carburetor and dome which results in good combustor performance and a good Pattern Factor. The present invention is also advantageous because it uses a swage operation instead of braze operation to attach the seal plate to the dome. The seal plate also provides easy removal of the swirler and baffle, while minimizing leakage and providing dimensional control.

BRIEF DESCRIPTION OF THE DRAWINGS

FIG. 5 is a schematic diagram illustrating installation of the seal plate into the dome plate in FIG. 3 just prior to swaging.

FIG. 6 is a schematic diagram illustrating installation of the seal plate into the dome plate in FIG. 3 just after swaging.

DETAILED DESCRIPTION OF THE INVENTION

Figure 1:
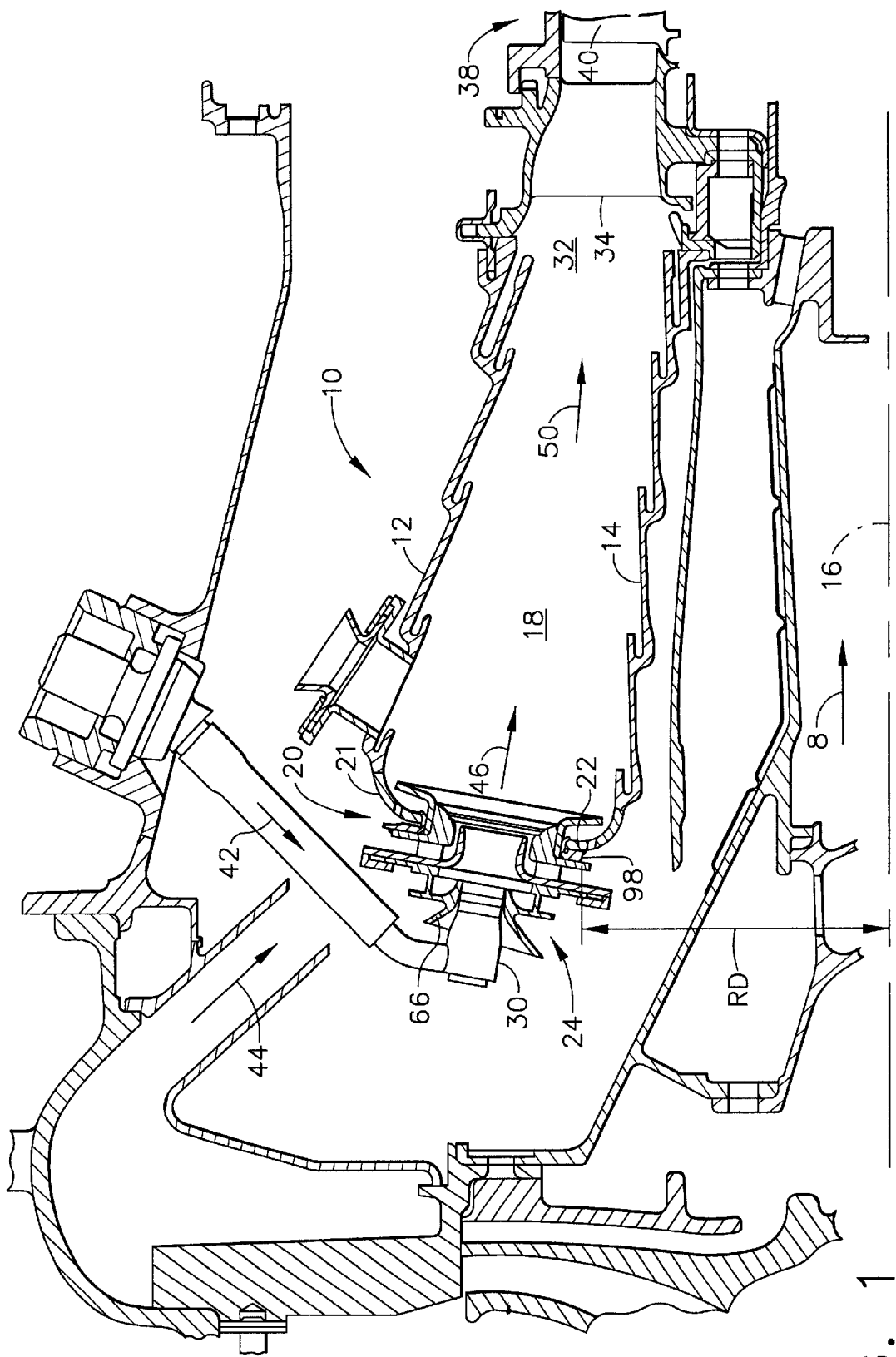
FIG. 1 is a centerline sectional view illustration of a gas turbine engine combustor section and adjacent structure including an exemplary embodiment of the dome assembly of the present invention.

Illustrated in FIG. 1 is an exemplary embodiment of a combustor dome assembly 20 of the present invention in a gas turbine engine combustor 10. The combustor 10 includes a pair of film-cooled radially outer and inner annular liners 12 and 14 disposed coaxially about a longitudinal engine centerline 16 of the combustor 10 and the gas turbine engine and extending in an aft or downstream direction 8. The outer and inner liners 12 and 14 are spaced from each other to define therebetween a combustion zone 18. At its upstream end, the combustor 10 includes the dome assembly 20 having an annular combustor dome 21 with an annular dome plate 22 at its upstream end and disposed coaxially about the centerline 16 which is conventionally fixedly connected to upstream ends of the liners 12 and 14. The annular dome plate 22 is a forward substantially conical portion of the annular combustor dome 21. The combustor dome assembly 20 includes a plurality of circumferentially spaced carburetors 24, which are additionally shown in FIG. 2.

Each of the carburetors 24 includes forward and aft air swirlers 25 and 26, respectively, having a longitudinal carburetor axis 28. The aft air swirler 26 includes an annular exit cone 116. The aft swirler 26 includes a septum 58 which defines the primary venturi having a diameter D1, a plurality of circumferentially spaced aft swirl vanes 60, and an annular exit cone 116, all formed together in an integral casting. The exit cone 116 has an annular cone flange 118 and an annular barrel 121 extending aftwardly from the cone flange. The barrel 121 has a cylindrical outer cone surface 122 and a somewhat horn or flared inner cone surface 123. The cone flange 118 has flat annular cone flange forward facing and aft facing flange surfaces 126 and 127, respectively.

The forward swirler 25 also includes a conventional ferrule 66 for slidably supporting a fuel injector 30 (see FIG. 1) therein, and includes a plurality of circumferentially spaced forward swirl vanes 62 and a flat annular radial flange 70 attached thereto. The radial flange 70 is slidably retained against the septum 58 by a retainer 72 attached to the septum. The fuel injector 30 and the swirler 26 are disposed coaxialby with the carburetor axis 28.

The combustor 10 includes at its downstream end, an annular combustor outlet 32 and is conventionally connected to a conventional turbine nozzle 34, which includes a plurality of circumferentially spaced nozzle vanes. Disposed downstream from the nozzle 34 is a high-pressure turbine (HIPT) 38 including a plurality of circumferentially spaced blades 40. In operation, fuel 42 is conventionally channeled through the injector 30 and discharged therefrom into the forward and aft swirlers 25 and 26 wherein it is mixed with a portion of compressed air 44 conventionally provided to the combustor 10 from a compressor (not shown). The swirlers 25 and 26 are effective for mixing the fuel 42 and the air 44 for creating a fuel/air mixture 46, which is discharged into the combustion zone 18, where it is conventionally ignited by a conventional igniter (not shown) disposed through the outer liner 12. Combustion gases 50 are generated and are channeled from the combustion zone 18 to the combustor outlet 32, to the turbine nozzle 34, and then to the HPT 38 which extracts energy therefrom for powering the compressor disposed upstream of the combustor 10.

Figure 2:
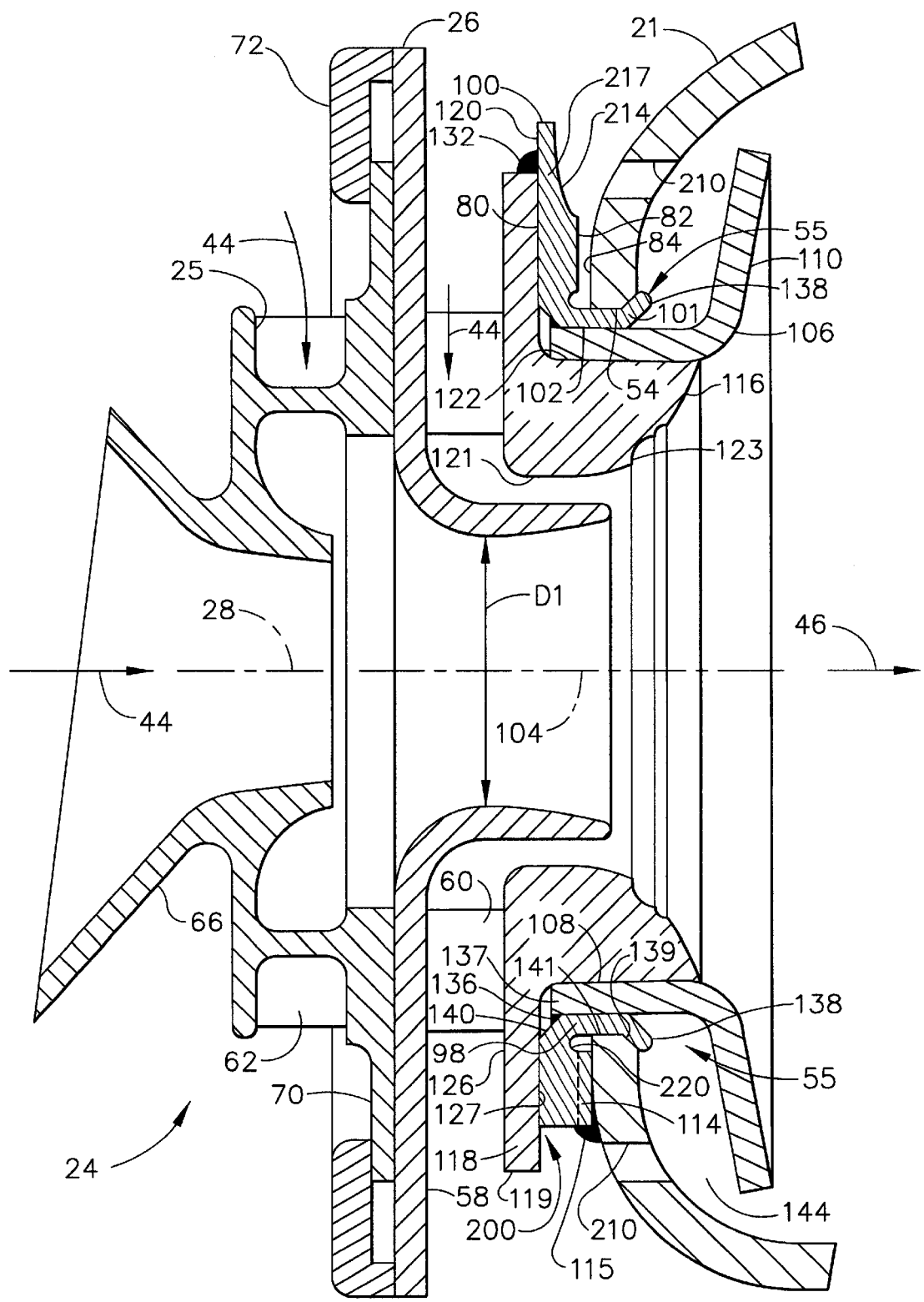
FIG. 2 is an enlarged sectional view illustration through a centerline axis of a carburetor of the dome assembly in the combustor section illustrated in FIG. 1.

Illustrated in FIG. 2 is an enlarged sectional view of the carburetor 24 disposed through a circular opening 54 in the dome plate 22. The dome assembly 20 includes a plurality of annular seal plate 98 having a seal plate flange 100 with a flat forward facing surface 80 and an aft facing surface 82, respectively, and a central ring 101 extending aftwardly from seal plate flange. The central ring 101 and a central bore 102 of the central ring are coaxially aligned with respective ones of circular openings 54 about a centerline axis 104. The seal plate flange 100 is mounted on forward facing side 84 of the dome plate 22 with the central ring 101 disposed through the circular opening 54. When the carburetor 24 is assembled in the combustor dome assembly 20, the longitudinal carburetor axis 28 is coaxial with the centerline axis 104. The carburetor 24 is mounted to the seal plate 98 with the exit cone 116 of the aft swirler 26 disposed within the central bore 102 of the central ring 101.

The seal plate 98 is mounted to the dome plate 22 by a swage joint 55 between the central ring 101 and dome plate to provide sealing and air leakage control between the air swirler 26 and dome plate 22. The central ring 101 has an aft end 138 which is bent by swaging to be inclined radially outwardly against a dome chamfer 139 along a circumference 141 of the circular opening 54 to provide the swage joint 55. A baffle 106 extends aftwardly from the seal plate 98 and is spaced aft of the combustor dome plate 22 for providing a channel 144 therebetween for channeling the compressed air 44 for cooling at least the baffle itself. Each baffle 106 includes a cylindrical tubular mounting portion 108 extending upstream through the bore 102 and fixedly joined to the seal plate flange 100 by three second tack welds 136 along the aft end 138 of the central ring 101. Tack welds are small spots of welded material that are easy to access and easy to remove or break the joint or tack weld. A flare portion 110 of baffle 106 extends aft from the tubular mounting portion 108 and away from the seal plate flange 100 and dome plate 22.

Each of the carburetors 24 is disposed through and supported by the tubular mounting portion 108 of the baffle 106. This arrangement provides a significant advantage with respect to ease of assembly and disassembly of the carburetors 24 and baffles 106 from the dome plate 22 and for obtaining a preferred orientation of a baffle flare portion 110 relative to the exit cone 116.

Figure 3:
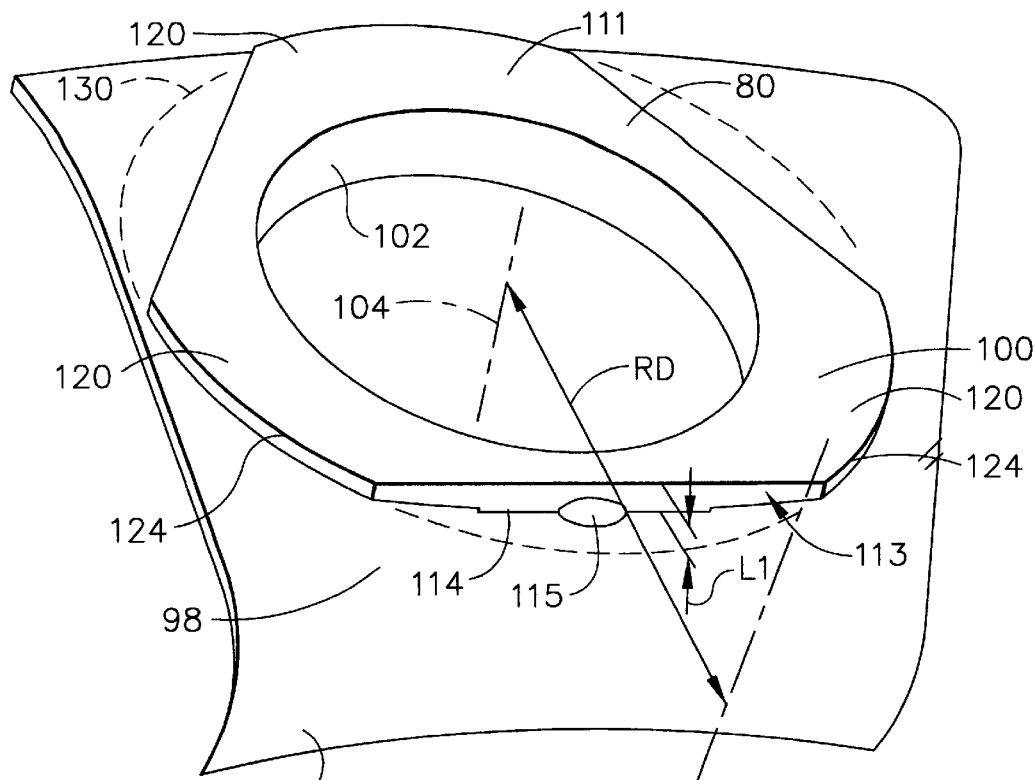
FIG. 3 is a forward looking aft perspective view of a seal plate mounted in a dome plate of the dome assembly illustrated in FIG. 2.
Figure 4:
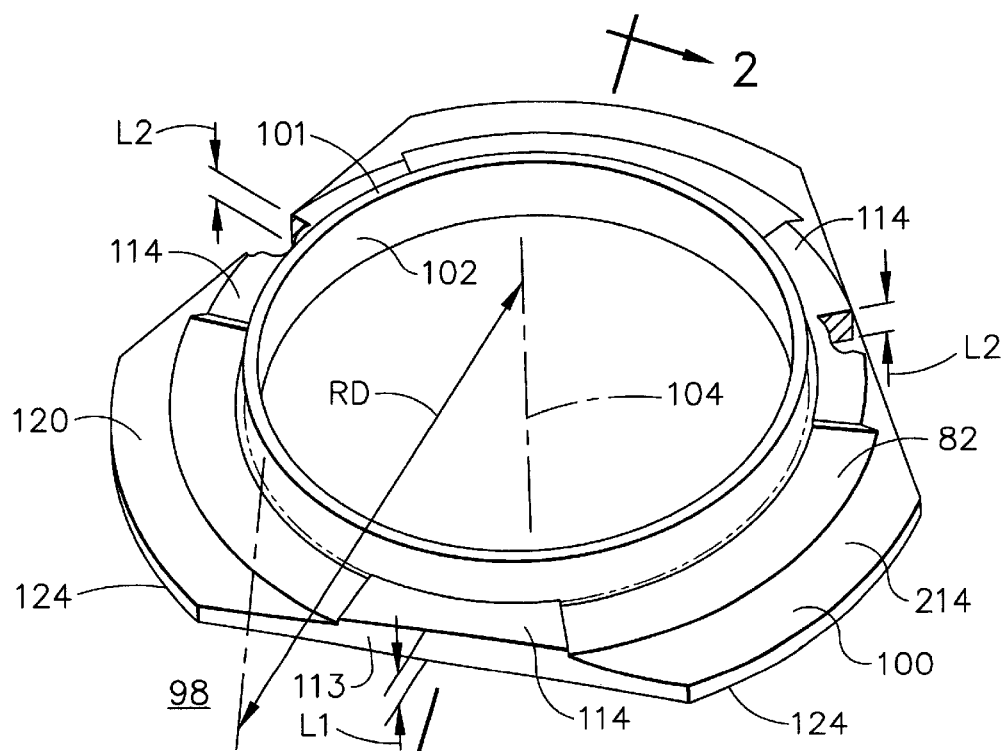
FIG. 4 is an aft looking forward perspective view of the seal plate illustrated in FIG. 3.

The seal plate 98 illustrated more particularly in FIG. 3 in the dome plate 22 and separately in FIG. 4 without the aft end 138 bent. The seal plate flange 100 is flat and the flat forward facing surface 80 has a basically rounded corner triangular shape 111. The seal plate flange triangular shape 111 is formed from a circle 130 (shown partially in dotted line) truncated along three straight lines forming three straight edges 113. The three rounded corners of the seal plate flange 100 are referred to as wings 120 which are having radially outer arcuate edges 124 with respect to the centerline axis 104. The seal plate flange 100 has three flat surfaced raised legs 114 extending axially aftwardly from the aft facing surface 82 of the seal plate flange wherein each of the legs is located about midway between each two of three wings 120 along the straight edges 113. The seal plate flange 100 is joined to the dome plate 22 by three first tack welds 115 between the legs and dome plate 22. The legs 114 are designed to contact the conical dome plate 22 and since all of the legs 114 are not located the same radial distance RD (see FIGS. 1 and 2 also) on the conical dome plate from the engine centerline 16 the legs have at least two different first and second lengths L1 and L2, respectively, to the dome plate 22 as measured from the forward facing surface 80 to the dome plate 22.

The truncated seal plate flange 100 is thus prevented from interfering with dome cooling holes 210 (see FIG.2) in the dome plate 22 which are located radially inwardly with respect to the centerline axis 104 of the radially outer arcuate edges 124 of the seal plate flange 100. Further referring to FIG. 2, undercuts 214 in the aft facing surface 82 along a radially outer portion 217 of the wings 120 with respect to the centerline axis 104 of the seal plate flange 100 provide access for cooling air to reach other dome cooling holes 210 which are axially inline with the wings and which are located radially inwardly with respect to the centerline axis 104 of the radially outer arcuate edges 124 of the seal plate flange 100. The seal plate flange 100 is used to attach the air swirler 26 to the dome plate 22. The seal plate flange 100 provides dimensional control for and easy removal of the swirler 26.

A flat interface 200 formed between the flat annular radial flange 70 of the swirler 26 and the flat forward facing surface 80 of the seal plate flange 100 limits and controls airflow leakage between swirler and seal plate. Airflow leakage between seal plate flange 100 and the dome plate 22 is eliminated by the swage joint 55 between seal plate and dome plate. The dome plate 22 is typically a sheet metal stamping which is inexpensive to produce but subject to significant surface distortion. The three legs 114 provide a stable attachment of the seal plate 98 to the dome plate 22 at three points of contact and overcome any problems that may arise due to surface distortions in the dome plate. The invention also allows the attachment of the seal plate 98 to the dome plate 22 without the swirler 26 and baffle 106 present.

The carburetor 24 is fixedly joined to the wings 120 of the seal plate flange 100 by three third tack welds 132 along a flange edge 119 of the annular flange of the exit cone 116. The cone flange 118 has flat annular cone flange forward facing and aft facing flange surfaces 126 and 127, respectively.

An undercut groove 220 is formed in the aft facing surface 82 along a circular intersection between the seal plate flange 100 and the central ring 101 to isolate the seal plate flange from the central ring 101 with the swaged aft end 138. This feature helps to preserve seal plate flange flatness during processing.

Illustrated in FIGS. 5 and 6 is a method of assembly for the combustor dome 21 by swaging the seal plate to the flat dome plate 22 using a press 240. The central ring 101 is inserted into the circular opening 54 and the press 240 is used to push ring through and bend the aft end 138 against a swaging tool 242 so that it is inclined radially outwardly against the dome chamfer 139 along a circumference 141 of the opening to produce the swage joint 55. A sufficient press load is applied to ensure that the legs 114 contact the dome plate 22 and that the aft end 138 of the central ring 101 bends or deforms properly to produce a good swage joint 55.

The three first tack welds 115 are between the legs 114 and the dome plate 22 which redundantly attach the seal plate 98 to the combustor dome 21. Then the outer and inner annular liners 12 and 14, respectively, are welded to the dome plate 22. The cylindrical tubular mounting portion 108 of the baffle 106 is then inserted through the aft end of the combustor dome 21 into the central bore 102 of the central ring 101 which are disposed through the circular opening 54 in the dome plate 22. The cylindrical tubular mounting portion 108 is then tack welded to the seal plate 98 by three second tack welds 136 along a bore chamfer 140 inside of the central bore 102 at a forward end 137 of the central ring 101.

The carburetor 24, including the forward and aft air swirlers 25 and 26 respectively, is fixedly joined to the wings 120 of the seal plate flange 100 by the three third tack welds 132 along a flange edge 119 of the annular flange of the exit cone 116. Removal of the parts is easily accomplished by removal of the above mentioned tack welds.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A dome assembly for a gas turbine engine combustor comprising:

an annular combustor dome having a substantially conical dome plate;

at least one circular opening in said dome plate;

a seal plate flange having an aft facing surface and a central ring extending aftwardly from said seal plate flange;

said central ring having a centerline axis is disposed through said circular opening;

said central ring includes a central bore coaxially aligned with said circular opening;

a baffle having a cylindrical tubular mounting portion extending upstream through said central bore and fixedly joined to said seal plate;

said baffle having a flare portion extending aft from said seal plate flange;

a carburetor including an air swirler having an annular exit cone;

said exit cone disposed within said cylindrical tubular mounting portion, having an annular radially outwardly extending annular cone flange and an annular barrel extending aftwardly from said the cone flange, and a radially inwardly facing annular inner cone surface for channeling air thereover and downstream over said baffle flare portion; and an aft end of said central ring is joined to said dome plate by a swage joint.

2. A dome assembly as claimed in claim 1 wherein said seal plate flange is flat, has a rounded corner triangular shape with three wings having radially outer arcuate edges with respect to said centerline axis and said seal plate flange is joined to said dome plate by second tack welds at three locations, each of said locations being between each of said three wings.

3. A dome assembly as claimed in claim 2 further comprising legs extending axially aftwardly from said aft facing surface of said seal plate flange wherein each of said legs is located about midway between each two of said three wings and said second tack welds are between said legs and said dome plate.

4. A dome assembly as claimed in claim 3 wherein said seal plate flange triangular shape is formed from a circle truncated along three straight lines forming three straight edges of said seal plate flange and each of said legs is located along a respective one of said straight edges.

5. A dome assembly as claimed in claim 4 further comprising first tack welds between a flange edge of an annular flange of said exit cone and said wings of said seal plate flange.

6. A dome assembly as claimed in claim 5 wherein said cylindrical tubular mounting portion of said baffle is fixedly joined to said seal plate by third tack welds to said aft end said central ring.

7. A dome assembly as claimed in claim 4 further comprising dome cooling holes disposed through said dome plate, said cooling holes being circumferentially spaced and located radially inwardly, with respect to said centerline axis, of said radially outer arcuate edges of said wings of said seal plate flange.

8. A dome assembly as claimed in claim 7 further comprising an undercut in each of said aft facing surfaces along radially outer portions of said wings of said seal plate flange and axially disposed in front of at least some of said dome cooling holes which are axially inline with said wings.

9. A dome assembly as claimed in claim 8 further comprising an undercut groove formed in said aft facing surface along a circular intersection between said seal plate flange and said central ring.

10. A dome assembly as claimed in claim 9 wherein said swage joint further comprises said aft end of said central ring bent by swaging to be inclined radially outwardly against a dome chamfer along a circumference of said circular opening in said dome plate.

11. A dome assembly as claimed in claim 1 wherein said swage joint further comprises said aft end of said central ring bent by swaging to be inclined radially outwardly against a dome chamfer along a circumference of said circular opening in said dome plate.

12. A dome assembly as claimed in claim 11 wherein said seal plate flange is flat, has a rounded corner triangular shape with three wings having radially outer arcuate edges with respect to said centerline axis and said seal plate flange is joined to said dome plate by second tack welds at three locations, each of said locations being between each of said three wings.

13. A dome assembly as claimed in claim 12 further comprising legs extending axially aftwardly from said aft facing surface of said seal plate flange wherein each of said legs is located about midway between each two of said three wings and said second tack welds are between said legs and said dome plate.

14. A dome assembly as claimed in claim 13 wherein said seal plate flange triangular shape is formed from a circle truncated along three straight lines forming three straight edges of said seal plate flange and each of said legs is located along a respective one of said straight edges.

15. A dome assembly as claimed in claim 14 further comprising first tack welds between a flange edge of an annular flange of said exit cone and said wings of said seal plate flange.

16. A dome assembly as claimed in claim 15 wherein said cylindrical tubular mounting portion of said baffle is fixedly joined to said seal plate by third tack welds to said aft end said central ring.

17. A dome assembly as claimed in claim 14 further comprising dome cooling holes disposed through said dome plate, said cooling holes being circumferentially spaced and located radially inwardly, with respect to said centerline axis, of said radially outer arcuate edges of said wings of said seal plate flange.

18. A dome assembly as claimed in claim 17 further comprising an undercut in each of said aft facing surfaces along radially outer portions of said wings of said seal plate flange and axially disposed in front of at least some of said dome cooling holes which are axially inline with said wings.

* * * * *